(12) United States Patent
Pellenc et al.

(10) Patent No.: US 6,769,238 B2
(45) Date of Patent: Aug. 3, 2004

(54) UNIVERSAL REMOVABLE TOOL-HOLDER TO BE MOUNTED ON A STRADDLING VINEYARD TRACTOR FOR AGRICULTURAL WORK IN TREE OR SHRUB PLANTATIONS

(75) Inventors: Roger Pellenc, Pertuis (FR); Robert Delran, Pertuis (FR)

(73) Assignee: Pellenc, S.A., Pertuis (FR)

( * ) Notice: Subject to any disclaimer, the term of this patent is extended or adjusted under 35 U.S.C. 154(b) by 16 days.

(21) Appl. No.: 09/993,400

(22) Filed: Nov. 6, 2001

(65) Prior Publication Data

US 2002/0084085 A1 Jul. 4, 2002

(30) Foreign Application Priority Data

Nov. 27, 2000 (FR) .............................................. 00 15295

(51) Int. Cl.[7] .............................................. A01D 46/00
(52) U.S. Cl. ............................................................. 56/328.1
(58) Field of Search ............................... 172/439, 446, 172/447, 449–451; 56/328.1, 330, 340.1

(56) References Cited

U.S. PATENT DOCUMENTS

| 2,640,405 A | * | 6/1953 | Wheeler | 172/449 |
|---|---|---|---|---|
| 3,561,789 A | * | 2/1971 | Stikeleather | 280/479 |
| 3,658,361 A | * | 4/1972 | Van Wyk | 172/248 |
| 3,844,357 A | * | 10/1974 | Ellinger | 172/4 |
| 4,164,985 A | * | 8/1979 | Bobard | 180/53.1 |
| 4,402,367 A | * | 9/1983 | Couser | 172/456 |
| 4,494,325 A | * | 1/1985 | Berthollet | 111/101 |
| 4,922,699 A | * | 5/1990 | Gantzer | 56/367 |
| 4,982,799 A | * | 1/1991 | Fujimoto et al. | 172/2 |
| 5,129,170 A | * | 7/1992 | Fusilli | 37/231 |
| 5,346,018 A | * | 9/1994 | Koster | 172/47 |
| 5,540,286 A | * | 7/1996 | Helmig | 172/15 |

* cited by examiner

Primary Examiner—Thomas B. Will
Assistant Examiner—Alicia Torres
(74) Attorney, Agent, or Firm—Harrison & Egbert (57) ABSTRACT

Removable universal tool-holder for mounting on a straddling vineyard tractor for agricultural work in tree or shrub plantations includes a main coupling chassis constructed so that it can be mounted, in a removable manner, on a straddling vineyard tractor; two secondary coupling chassis, each provided with a universal three-point hitch system; mechanisms connecting each secondary coupling chassis to the main coupling chassis; and mechanisms that make it possible to move each secondary coupling chassis in a vertical or approximately vertical plane and, preferably, in a horizontal or approximately horizontal plane. It is understood that the universal tool-holder can support machines constructed to accomplish cultivation or treatment work such as: hoeing, mowing, plowing, harrowing, spraying, thinning out leaves, pruning, lopping, etc.

8 Claims, 9 Drawing Sheets

UNIVERSAL REMOVABLE TOOL-HOLDER TO BE MOUNTED ON A STRADDLING VINEYARD TRACTOR FOR AGRICULTURAL WORK IN TREE OR SHRUB PLANTATIONS

BACKGROUND OF THE INVENTION

1. Field of the Invention

The invention presented here involves a universal tool-holder designed to be installed, in a manner so that it can be removed, on a straddling vineyard tractor for the mounting of at least two agricultural machines fitted to perform identical or different work in plantations of trees or shrubs planted in rows such as vineyards or orchards.

2. Description of Related Art

Straddling vineyard tractors are usually used to support the different equipment of harvesting machines (mechanical grape harvesters . . . ) or treatment machines (sprayers . . . , or machines for pruning or thinning leaves, or machines for working the soil, etc.

In all cases, the equipment-holder chassis or tool-holder chassis used are shaped in a specific manner in order to comprise the working assemblies designed to accomplish the specified jobs. Taking into account the variety of the work to be done in the vineyards or other plantations, one is led to use several types of tool-holders, and this creates different types of restrictions (purchase cost and maintenance cost, time for assembly and disassembly, space for storage, etc.).

All of these chassis do not have a multifunctional character and do not allow the mounting of machines provided with standard attachment mechanisms on the three-point hitch device of inter-row farm tractors.

The invention intends, notably, to correct this insufficiency.

BRIEF SUMMARY OF THE INVENTION

According to the invention, this objective is attained using a universal tool-holder that consists of: a main coupling chassis constructed so that it can be mounted, in a removable manner, on a straddling vineyard tractor; two secondary coupling chassis, each provided with a universal three-point hitch system; mechanisms connecting each secondary coupling chassis to the main coupling chassis; and mechanisms that make it possible to move each secondary coupling chassis of in a vertical or approximately vertical plane and, preferably, in a horizontal or approximately horizontal plane.

It is understood that it is possible to mount a farm machine, provided with the standard three-point mounting mechanisms, on each secondary coupling chassis of the universal tool-holder, and that these machines can be moved while simultaneously working in two adjacent inter-rows of the vineyard or other plantation, in a manner so as to perform jobs that are identical, complementary, or different, involving the two sides of the row that is straddled by the straddling vineyard tractor and one side of the two adjacent rows, or the two inter-rows positioned on either side of the row that is spanned. One obtains, in this manner, significant gains in the time it takes to perform the work.

It is understood that the universal tool-holder can support machines constructed to accomplish cultivation or treatment work such as: hoeing, mowing, plowing, harrowing, spraying, thinning out leaves, pruning, lopping, etc.

The use of this universal tool-holder thus proves to be very profitable relative to the use of several specific tool-holders, notably in the usage costs, the time for mounting/dismounting and maintenance, and the space dedicated to storage.

According to another characteristic arrangement, the mechanisms connecting each secondary coupling chassis to the main coupling chassis consist of, for each of them, an arm consisting of at least one beam connected, by means of its ends and joints at the perpendicular axes or at the crosspiece, on the one hand, to the secondary coupling chassis and, on the other hand, to the upper part and in the vicinity of one of the sides of the main coupling chassis.

According to another characteristic arrangement, the mechanisms connecting each secondary coupling chassis to the main coupling chassis also consist of a connecting rod or tie rod extending parallel to the beam and constituting, with this beam, the large sides of a deformable parallelogram arranged in a vertical plane.

According to another characteristic arrangement, the pivoting movements of the carrier arm in the vertical plane are obtained by means of a jack arranged below the arm and connected, by means of its ends and by means of joints, to the main coupling chassis and to the beam.

These arrangements make it possible to place the secondary coupling chassis carrying the cultivation or treatment machines either in a low position by which the machines are located correctly placed to do the work for which they are constructed, or in a high position by which the assembly comprised of the straddling vineyard tractor, the universal tool-holder, and the machines installed on it, can easily turn at the end of the row, even when the available space is relatively reduced, or in an intermediate position between the two preceding ones.

According to another characteristic arrangement, the mechanisms connecting each secondary coupling chassis to the main coupling chassis also comprise a connecting rod extending parallel to the beam and laterally relative to it, this connecting rod or tie rod constituting, with the beam, the large sides of a deformable parallelogram arranged in a plane perpendicular to the vertical plane.

According to another characteristic arrangement, the pivoting movements of the carrier arm in the plane perpendicular to the vertical plane are obtained by means of a jack arranged laterally relative to the arm and connected, by means of its ends and by means of joints, to the main coupling chassis and to the beam.

Using these arrangements, the secondary coupling chassis can be placed in the desired position as a function of the spacing of the rows of plants and the work to be done; they can, in addition, be placed in a position raised and close together, i.e. superpositioned, in a manner so that the width of the assembly comprised of the straddling vineyard tractor, the universal tool-holder and the machines mounted on it, does not exceed the size specified by the regulations of road traffic.

According to another characteristic arrangement, each secondary coupling chassis is equipped with a detector oriented downwards and making it possible to control the position, relative to the ground, of the assembly comprised of this secondary coupling chassis and the machine installed on it, the detector or sensor making it possible to monitor the height of this assembly by means of an appropriate hydraulic circuit.

According to another characteristic arrangement, each secondary coupling chassis is equipped with a hydraulic motor having an output shaft that is equipped with a coupling instrument similar to the power take-off shaft of a farm tractor.

This motor makes it possible to activate, for example, by means of a cardan shaft, one or more tools or active instruments of the machines carried by the secondary coupling chassis.

According to another characteristic arrangement, the tool-holder is constructed to receive the removable stands on which it rests when it is separated from the straddling vineyard tractor.

This device makes the mounting of the universal tool-holder on the straddling vineyard tractor extremely easy and allows its storage when it is not in periods of use.

BRIEF DESCRIPTION OF THE SEVERAL VIEWS OF THE DRAWINGS

The goals, characteristics, and advantages above, and even others, are better explained in the description that follows and in the attached drawings in which.

DETAILED DESCRIPTION OF THE INVENTION

Reference is made to the drawings to describe an embodiment example of interest, though non-restrictive, of the universal tool-holder of the invention and an example of the use of it.

The universal tool-holder according to the invention consists of: a main coupling chassis designated in its entirety by reference indicator 1, this main coupling chassis being constructed in order to be able to be mounted, in a removable manner, on a multi-functional straddling vineyard tractor; two secondary coupling chassis designated, in their entirety, by the reference indicators 2A, 2B, each of these secondary coupling chassis being equipped with a universal three-point hitch system; mechanisms connecting each secondary coupling chassis 2A, 2B to the main coupling chassis 1; and mechanisms making it possible to move each secondary coupling chassis 2A, 2B, in a vertical or approximately vertical plane and, preferably, in a horizontal or approximately horizontal plane.

The main coupling chassis 1 is comprised of a sturdy assembly of metallic parts and it is equipped with mechanisms allowing it to be removably assembled behind the straddling vineyard tractor.

These mechanisms consist of, for example: in the upper part, a central joint 3 united with the chassis 1; and, in a low part, and on each side of this chassis, a coupling instrument 4a, 4b.

This central joint 3 and these lateral coupling instruments 4a, 4b allow the removable attachment, easy and rapid, of the main coupling chassis on the complementary coupling mechanisms that the rear part of the straddling vineyard tractor usually has.

The central joint 3 can be made of a half-collar that attaches by means of nuts and bolts, to a complementary half-collar united with the rear part of the straddling vineyard tractor, while the coupling instruments 4a, 4b can be made up of centering cones that engage in the holes or housings in the rear part and are locked by means of a similar bolt or device.

The secondary coupling chassis 2A, 2B are also comprised of a solid assembly of metallic parts. They are provided on their rear side with a universal three-point hitch system similar to the hitch device of farm tractors, this system consisting of, in the upper part, a coupling rod 5 and, in the lower part, two spaced symmetrical coupling arms 6a, 6b.

The mechanisms connecting each secondary coupling chassis 2A, 2B to the main coupling chassis 1 are comprised of an arm designated in its entirety by the reference indicator 7. Each of these arms consists of at least one sturdy beam 8 connected, by means of its ends and by means of a joint at perpendicular axes or at crosspieces 9 and 10, on the one hand, to the secondary coupling chassis and, on the other hand, near to one of the sides of the main coupling chassis, respectively.

According to another characteristic arrangement, each secondary coupling chassis 2A, 2B is connected to the main coupling chassis 1 by means of a connecting rod or tie-rod 11 extending parallel to the beam 8, preferably above it, and fixed by means of its opposing ends and by means of ball-and-socket joints 12, 13, on the one hand, to a cover 2a united with the upper part of the secondary coupling chassis and, on the other hand, to a cover 1b united with a horizontal beam 1a that comprises the upper element of the main coupling chassis 1, respectively.

This connecting rod or tie rod 11 and the beam 8 make up in this way the large sides of a deformable parallelogram arranged in a vertical plane and whose small sides are comprised of portions of the main coupling chassis and secondary coupling chassis delimited by the joints 10, 13 and 9, 12, respectively.

In addition, each secondary coupling chassis 2A, 2B is connected to the main coupling chassis 1 by means of a connecting rod or tie rod 14 extending parallel to the beam 8, on the exterior side of it, and fixed by means of its opposing ends and by means of ball-and-socket joints 15, 16, on the one hand, to a cover 2b united with the secondary coupling chassis and, on the other hand, to a lateral element 1c of the main coupling chassis, respectively.

This connecting rod or tie rod 14 and the beam 8 thus constitute the large sides of a deformable parallelogram arranged in a plane perpendicular to the vertical plane and having small sides that are comprised of the portions of the main coupling chassis and the secondary coupling chassis delimited by the joints 10, 16 and 9, 15, respectively.

The vertical movements of each arm 7 thus created are ensured by a powerful hydraulic jack arranged below the beam 8 and fixed by means of its opposing ends and by means of ball-and-socket joints 18, 19, on the one hand, to the intermediate part of the beam, and on the other hand, in the low part of the main coupling chassis 1, respectively.

The horizontal movements of each arm 7 are obtained by means of a hydraulic jack 20 arranged on the interior side of the beam 8 and connected by means of its opposing ends and by means of ball-and-socket joints 21, 22, on the one hand, to the intermediate part of the beam 8, and, on the other hand, to an element affixed to the main coupling chassis 1, next to the median plane of it.

Using the configuration that was just described, the arms 7 of the universal tool-holder can be placed together or separately in an endless number of positions, as a function of the requirements.

Each secondary coupling chassis is equipped with a detector or sensor 23 oriented downwards and installed at the lower end of a vertical element 2c of the secondary coupling chassis, this element can have a length that is adjustable in a manner so as to permit the adjustment of the position of this sensor as a function of the type of the work performed by the machines M installed on the secondary coupling chassis 2A, 2B.

This sensor drives the electrodistributor of the hydraulic supply circuit of the jacks 17. When the sensor 23 of one of the arms 7 is located away from the ground, it activates the electrodistributor of the hydraulic circuit for driving the position of this arm, in order to ensure the pivoting of it downwards.

According to another characteristic arrangement, a hydraulic motor 24 is installed freed on each secondary coupling chassis 2A, 2B and the output shaft 25 of this motor or output shaft of the speed multiplier coupled to it is equipped with a universal coupling instrument similar to the power take-off shaft of a farm tractor.

It is understood that when a farm tractor is coupled by the universal three-point hitch device to each secondary coupling chassis 2A or 2B, the hydraulic motor 24 supported by it permits the activation of the active tools or instruments of the machine, for example, by means of a cardan shaft.

Figure 9:
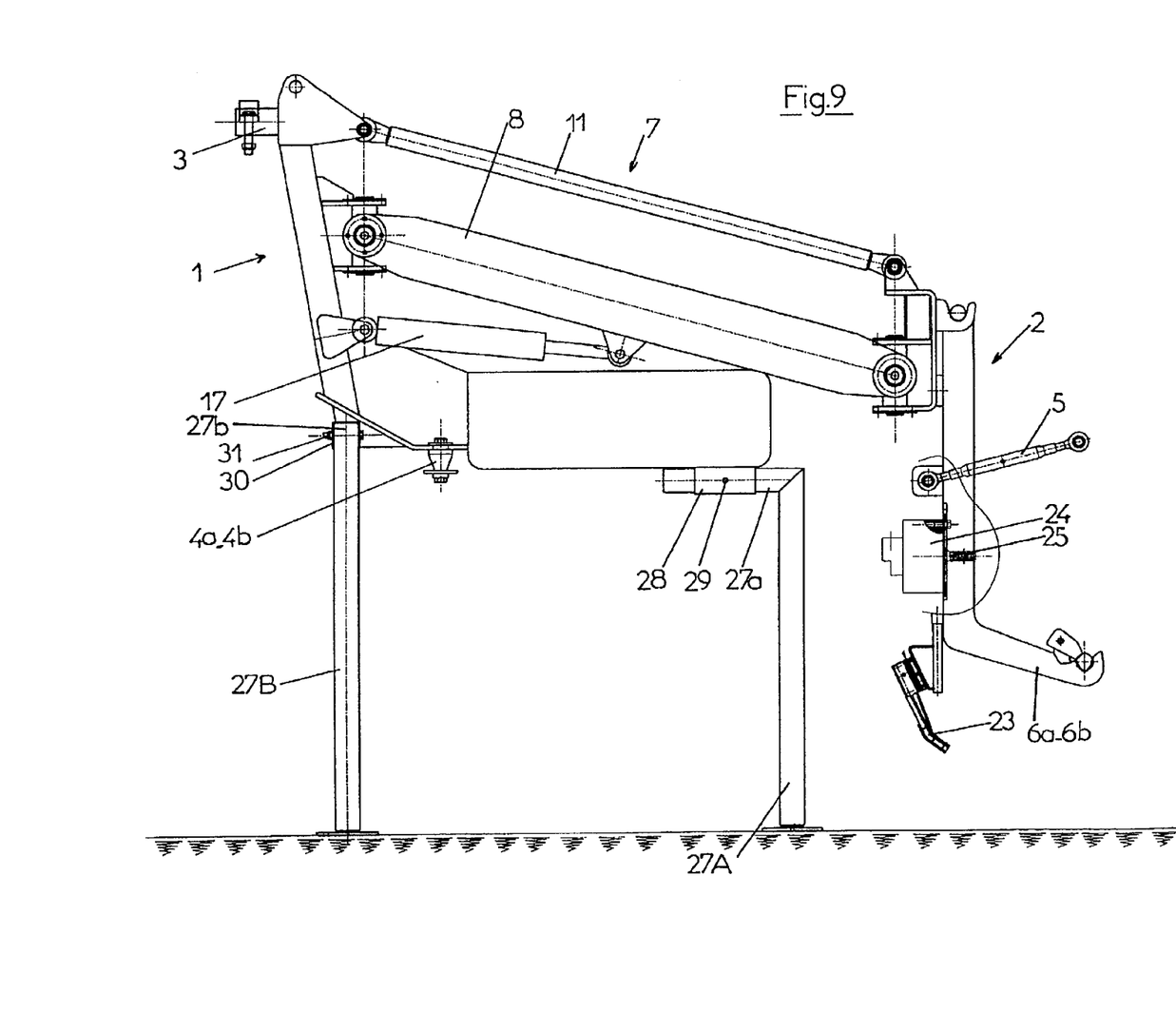
FIG. 9 is an elevation view of the universal tool-holder resting on the removable stands during periods of non-use.

According to another characteristic arrangement, the universal tool-holder according to the invention is provided with mechanisms that permit the mounting of removable stands (27A, 27B) on which it rests when it is separated from the straddling vineyard tractor (FIG. 9).

The main coupling chassis 1 consists of, for example: on the one hand, in the lower part, at the rear and laterally, horizontal sleeves having a quadrangular cross-section 28, at the longitudinal axis and in which the upper part of the stands 27A can be engaged, comprised of a coupling part 27a oriented orthogonally, the assembly being secured by means of a core pin 29 or other connecting rod going through the aligned holes arranged in the sleeves and in the coupling parts; and, on the other hand, also in the lower part, at the front and laterally, covers or sleeves 30 delimiting the housings oriented transversally and in which the upper part 27b of the stands 27B can be engaged, the assembly being secured by a core pin 31 or similar connecting rod going through the aligned holes arranged in the sleeves and in the coupling parts.

This arrangement of the universal tool-holder according to the invention makes extremely easy the mounting operations of it on a straddling vineyard tractor and its removal at the end of work.

Figure 1:
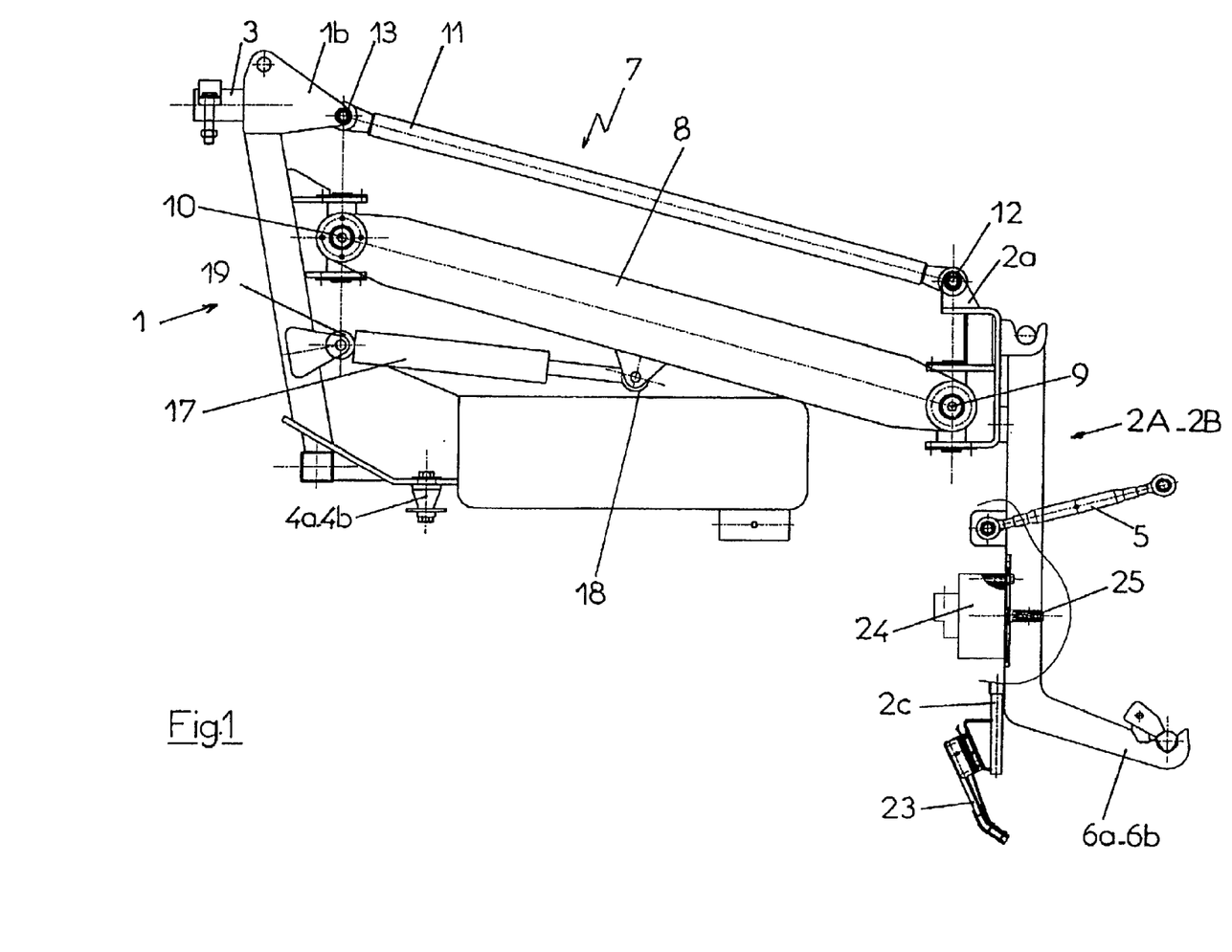
FIG. 1 is an elevation view of the universal tool-holder according to the invention.
Figure 2:
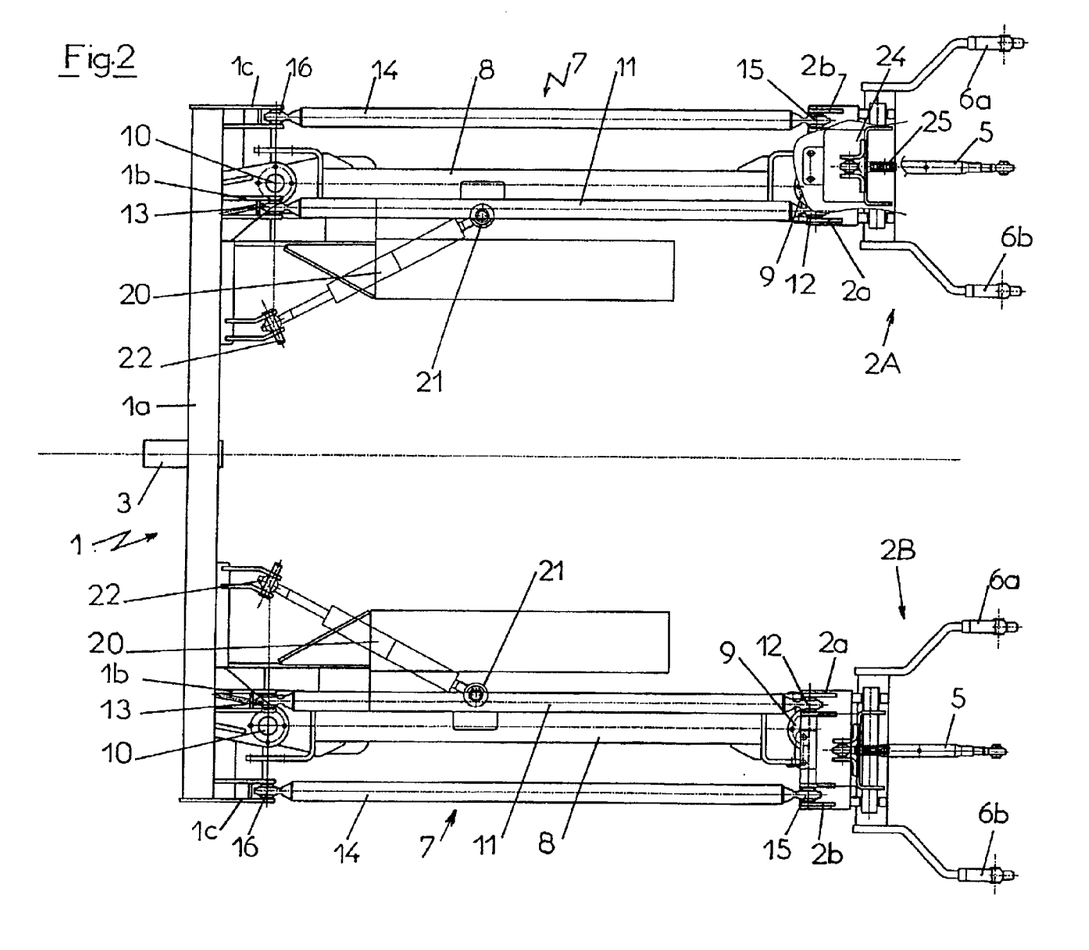
FIG. 2 is a plan view of the tool-holder.
Figure 3:
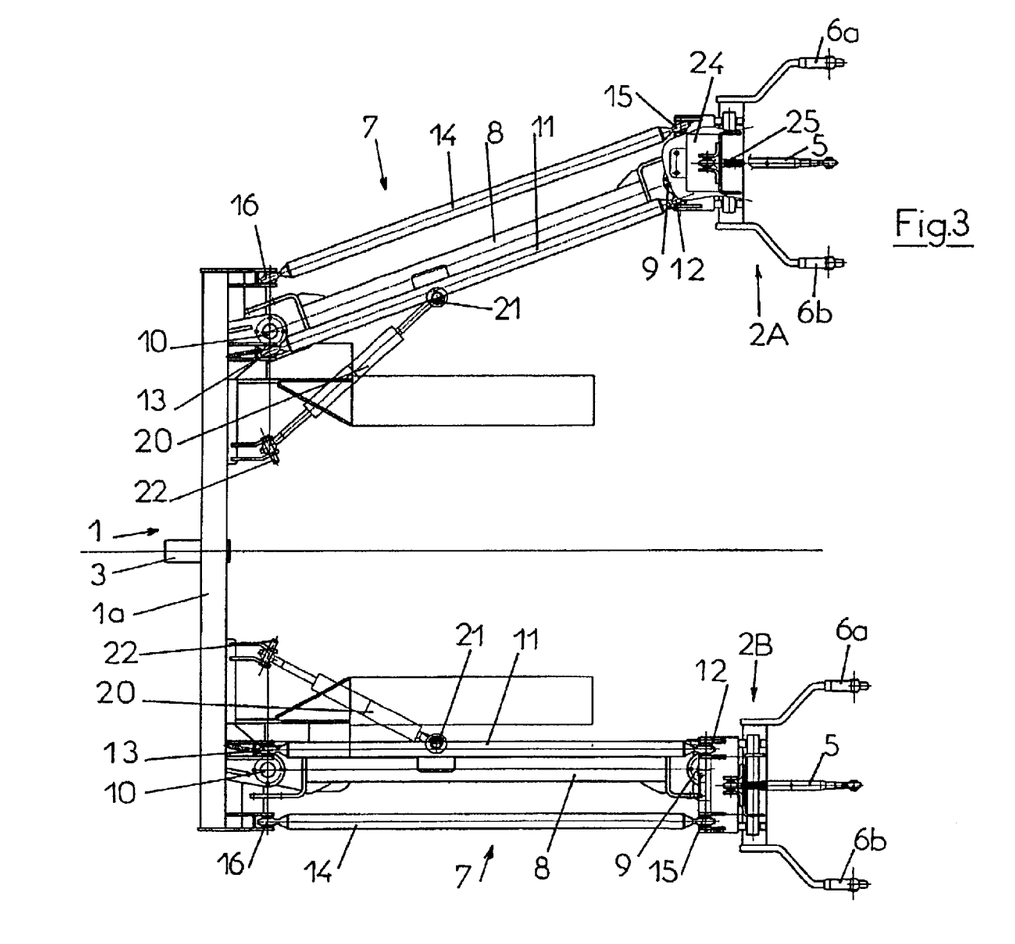
FIG. 3 is a plan view, on a more reduced scale, showing the lateral pivoting, to the outside, of one of the arms of the tool-holder.
Figure 4:
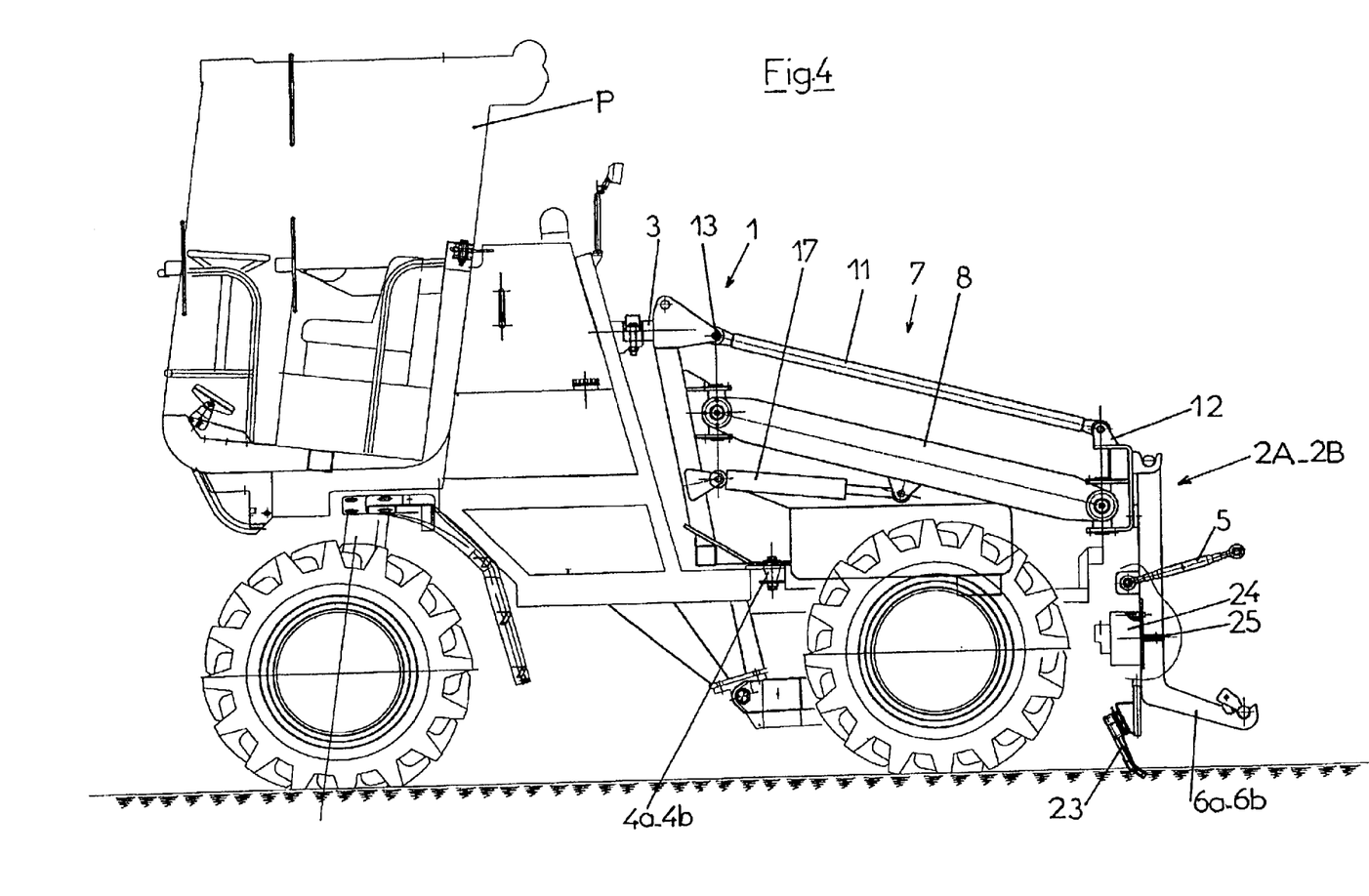
FIG. 4 is an elevation view of the universal tool-holder shown behind the straddling vineyard tractor.
Figure 5:
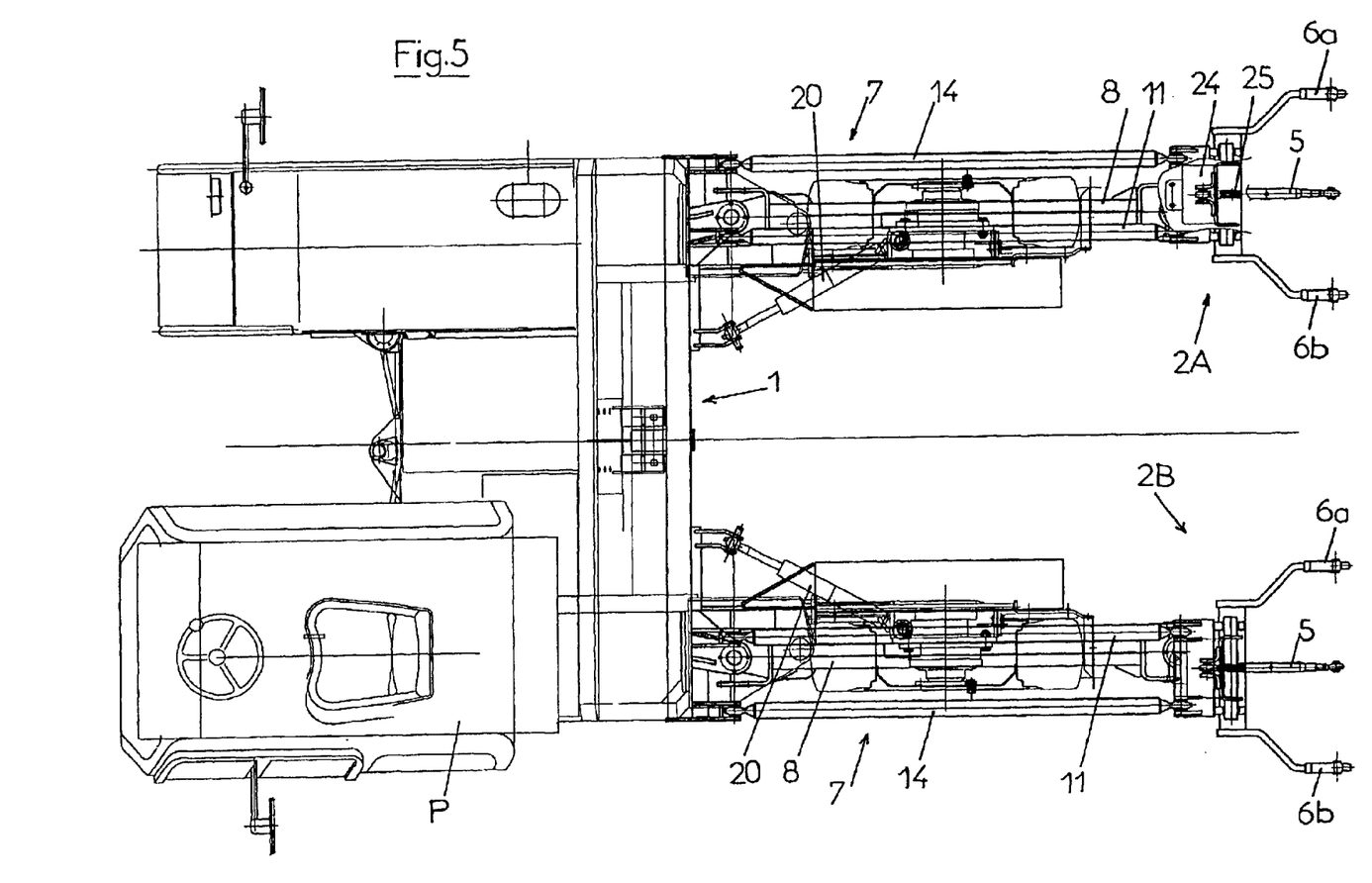
FIG. 5 is a plan view of FIG. 4.
Figure 6:
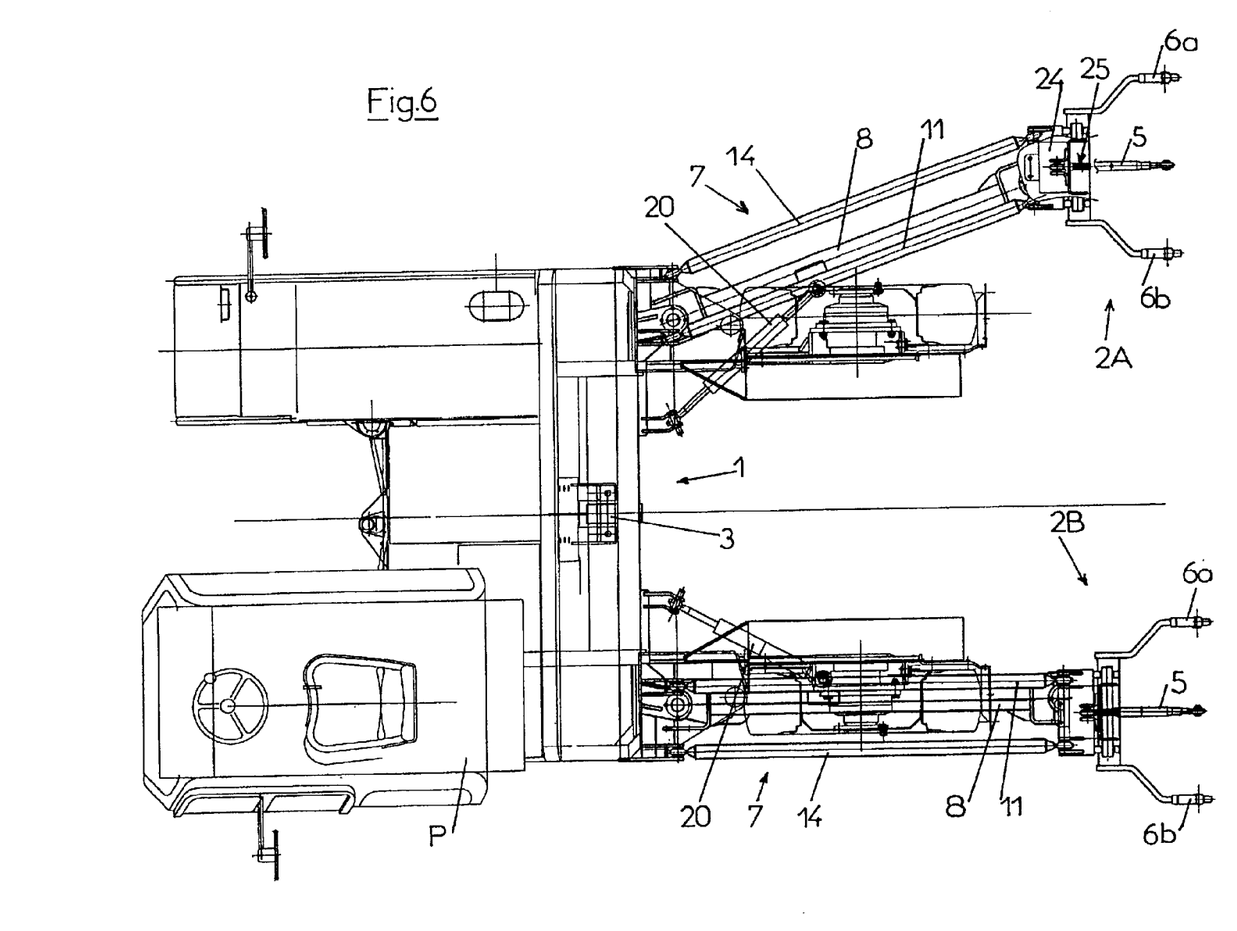
FIG. 6 is a plan view similar to FIG. 5 and at a much reduced scale, showing the lateral pivoting, to the outside, of one of the arms of the tool-holder.
Figure 7:
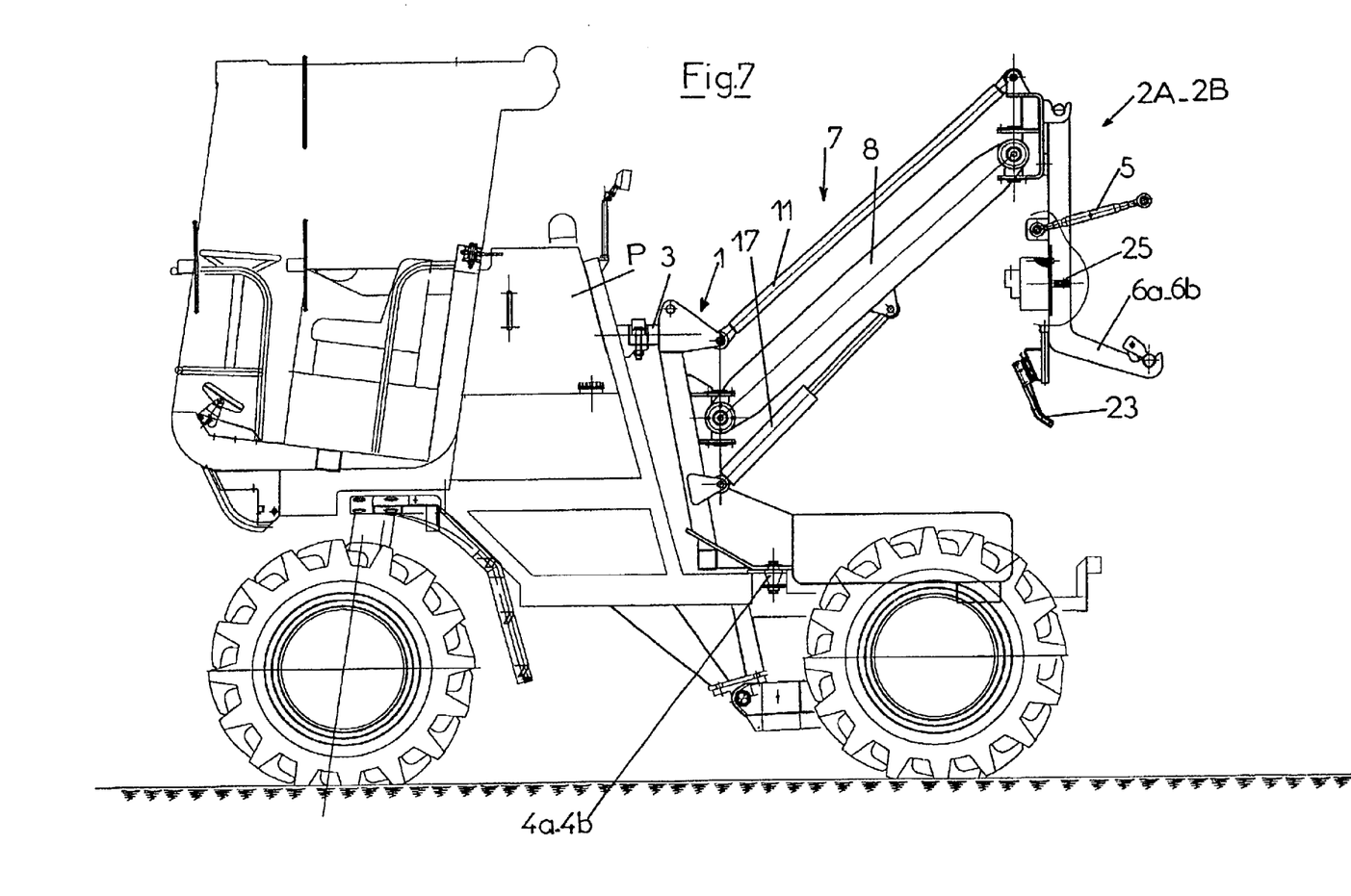
FIG. 7 is a view similar to FIG. 4, showing the secondary coupling chassis in a raised position.
Figure 8:
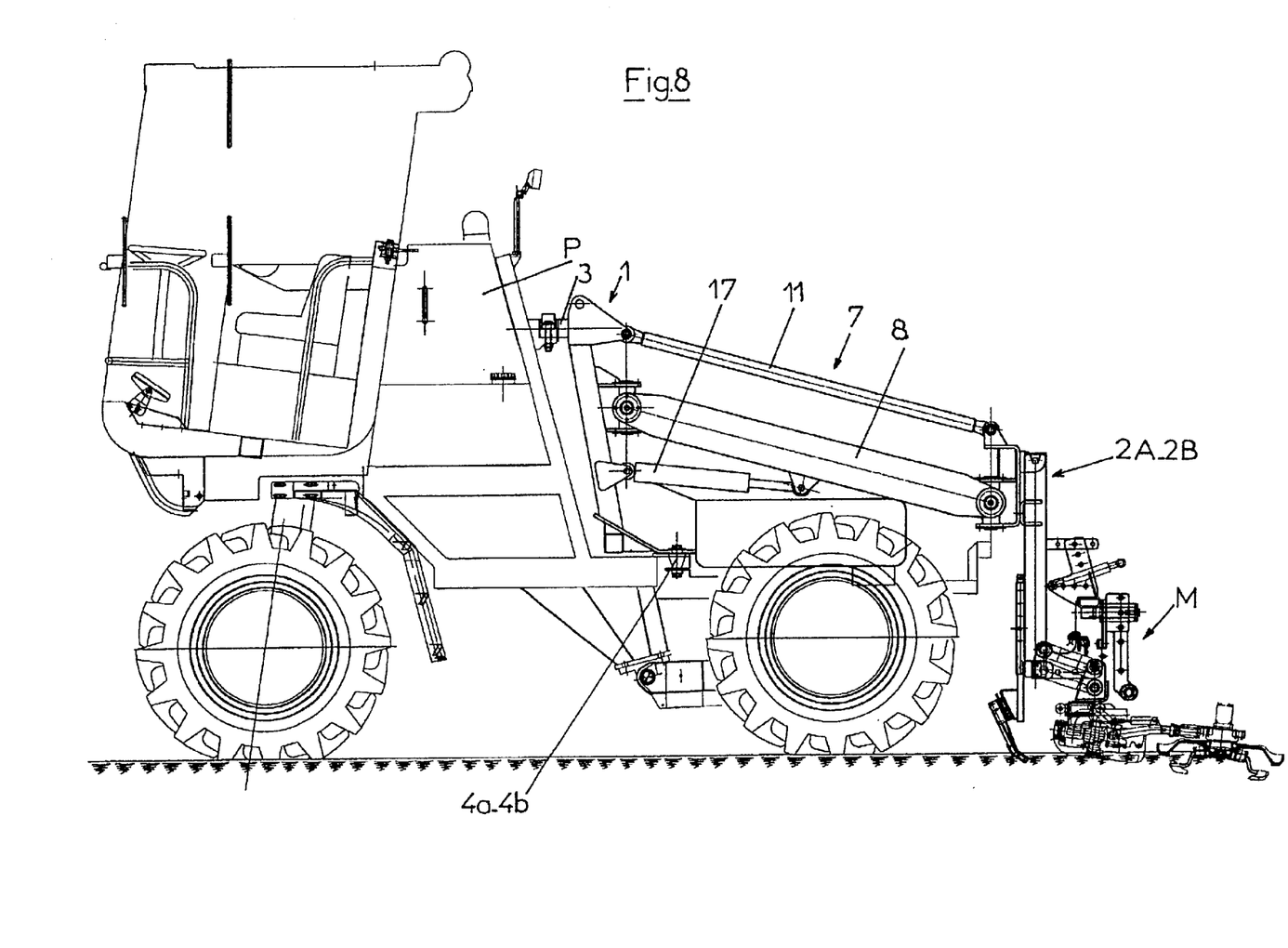
FIG. 8 is an elevation view of the universal tool-holder mounted and installed on a straddling vineyard tractor and having secondary coupling chassis that support the machines for cultivation of the soil, the secondary coupling chassis being shown in a low working position.

It is shown in FIG. 8, as a usage example, the mounting of hoeing or mowing machines M on the secondary coupling chassis of the universal tool-holder of the invention, but as indicated previously, the purpose of the invention is to make it possible to mount on the tool-holder, at least a pair of various agricultural machines equipped with a standard system for coupling to the universal three-point hitch device of the farm tractor.

We claim:

1. A removable universal tool holder for mounting on a straddling vineyard tractor for agricultural work in tree or shrub plantations, the tool holder comprising:

a primary chassis having means thereon for removable mounting to the tractor;

a first secondary chassis having a universal three-point hitch mechanism connected thereto;

a second secondary chassis having a universal three-point hitch mechanism connected thereto;

a first arm directly connected to and extending between said primary chassis and said first secondary chassis;

a second arm directly connected to and extending between said primary chassis and said second secondary chassis, each of said first and second arms being coupled to said primary chassis by a joint means, said joint means for allowing the pivoting the respective arm in an approximately vertical plane and in an approximately horizontal plane;

a first pivoting means cooperative with said primary chassis and with said first arm for pivoting said first arm in the approximately vertical plane and in the approximately horizontal plane; and a second pivoting means cooperative with said primary chassis and with said second arm for pivoting said second arm in the approximately vertical plane and in the approximately horizontal plane, said first arm comprising a first beam having one end connected by said joint means to said primary chassis and an opposite end connected by said joint means to said first secondary chassis, said first arm further comprising a first tie rod extending parallel to and above said first beam, said second arm comprising a second beam having one end connected by said joint means to said primary chassis and an opposite end connected by said joint means to said second secondary chassis, said second arm further comprising a second tie rod extending parallel to and above said second beam, said first and second arms being of a deformable parallelogram shape.

2. The tool holder of claim 1, said first pivoting means comprising a first jack positioned below said first arm and connected at opposite ends thereof by a joint to each of said primary chassis and to said first beam, said second pivoting means comprising a second jack positioned below said second arm and connected at opposite ends thereof by a joint to each of said primary chassis and to said second beam.

3. The tool holder of claim 2, said first arm further comprising a first connecting rod extending parallel to said first beam, said first connecting rod connected to said primary chassis and to said first secondary chassis, said second arm further comprising a second connecting rod extending parallel to said second beam, said second connecting rod connected to said primary chassis and to said second secondary chassis, the respective connected rod and the respective first beam defining a large side of the parallelogram extending in a plane perpendicular to the vertical plane.

4. The tool holder of claim 3, said first pivoting means further comprising a third jack arranged laterally relative to said first arm, said third jack connected at opposite ends thereof by respective joints to said primary chassis and to said first beam, said second pivoting means further comprising a fourth jack arranged laterally relative to said second arm, said fourth jack connected at opposite ends thereof by respective joints to said primary chassis and to said second beam.

5. The tool holder of claim 4, each of said joints being a ball-and-socket joint.

6. The tool holder of claim 1, further comprising:
a detecting means connected to and oriented downwardly from respectively said first and second chassis, said detecting means for monitoring a height of the tool holder.

7. The tool holder of claim 1, further comprising:
a hydraulic motor connected to each of said first and second secondary chassis, said hydraulic motor having an output shaft with a coupling at an end thereof.

8. The tool holder of claim 1, further comprising:
stand mounting means interconnected to said primary chassis, said stand mounting means for removably receiving a stand therein.

* * * * *